US007001562B2

(12) United States Patent
Schiffer et al.

(10) Patent No.: US 7,001,562 B2

(45) Date of Patent: Feb. 21, 2006

(54) METHOD FOR TREATING FIBROUS WEB MATERIALS

(75) Inventors: Daniel Kenneth Schiffer, Marietta, GA (US); Clayton James Logan, Hendersonville, NC (US); Michael David Powers, Canton, GA (US); Hue Scott Snowden, Woodstock, GA (US)

(73) Assignee: Kimberly Clark Worldwide, Inc., Neenah, WI (US)

( * ) Notice: Subject to any disclaimer, the term of this patent is extended or adjusted under 35 U.S.C. 154(b) by 369 days.

(21) Appl. No.: 10/329,614

(22) Filed: Dec. 26, 2002

(65) Prior Publication Data

US 2004/0124565 A1 Jul. 1, 2004

(51) Int. Cl.

*B29C 71/02* (2006.01)
*B29C 71/04* (2006.01)
*D06B 1/02* (2006.01)
*D06B 3/10* (2006.01)

(52) U.S. Cl. ...................... 264/491; 264/101; 264/129; 264/130; 264/345

(58) Field of Classification Search ................ 264/101, 264/129, 130, 211.14, 234, 345, 475, 491
See application file for complete search history.

(56) References Cited

U.S. PATENT DOCUMENTS 3,802,817 A 4/1974 Matsuki et al.
3,849,241 A 11/1974 Butin et al.
3,855,046 A 12/1974 Hansen et al.
3,882,211 A 5/1975 Kamp
3,914,080 A 10/1975 Kamp
3,952,124 A 4/1976 Mesek
4,010,752 A 3/1977 Denny
4,041,203 A 8/1977 Brock et al.
4,045,833 A 9/1977 Mesek et al.
4,081,582 A 3/1978 Butterworth et al.
4,082,886 A 4/1978 Butterworth et al.
4,111,744 A 9/1978 Reiniger
4,156,592 A 5/1979 Wood
RE30,061 E 7/1979 Shepherd
4,188,355 A 2/1980 Graham et al.
4,340,563 A 7/1982 Appel et al.
4,515,656 A 5/1985 Memeger, Jr.
4,622,238 A 11/1986 Franz et al.
4,631,215 A 12/1986 Welygan et al.
4,888,091 A 12/1989 Nollen et al.
4,963,431 A 10/1990 Goldstein et al.
5,011,642 A 4/1991 Welygan et al.
5,026,800 A 6/1991 Kimura et al.
5,108,820 A 4/1992 Kaneko et al.
5,149,576 A 9/1992 Potts et al.
5,152,809 A 10/1992 Mattesky
5,178,931 A 1/1993 Perkins et al.
5,244,735 A 9/1993 Kimura et al.
5,252,158 A 10/1993 Shimizu et al.
5,281,683 A 1/1994 Yano et al.
5,336,552 A 8/1994 Strack et al.
5,382,400 A 1/1995 Pike et al.

(Continued)

FOREIGN PATENT DOCUMENTS

EP 1050612 A1 11/2000

(Continued)

*Primary Examiner*—Leo B. Tentoni
(74) *Attorney, Agent, or Firm*—Robert A. Ambrose

(57) ABSTRACT

The present invention provides an efficient method for topically treating and drying fibrous web materials such as nonwoven web materials and nonwoven laminate materials without unduly damaging the materials due to excessive heating during drying.

18 Claims, 1 Drawing Sheet

U.S. PATENT DOCUMENTS

| | | | | |
|---|---|---|---|---|
| 5,455,108 | A | 10/1995 | Quincy et al. | |
| 5,498,468 | A | 3/1996 | Blaney | |
| 5,500,254 | A | 3/1996 | Quincy, III et al. | |
| 5,525,415 | A | 6/1996 | Quincy, III et al. | |
| 5,540,984 | A | 7/1996 | Quincy, III et al. | |
| 5,641,449 | A * | 6/1997 | Owens | 264/491 X |
| 5,669,896 | A | 9/1997 | Kielpikowski | |
| 5,728,634 | A | 3/1998 | Everhart et al. | |
| 5,736,473 | A | 4/1998 | Cohen et al. | |
| 5,798,078 | A | 8/1998 | Myers | |
| 5,804,021 | A | 9/1998 | Abuto et al. | |
| 5,814,567 | A | 9/1998 | Yahiaoui et al. | |
| 5,824,172 | A | 10/1998 | Kielpikowski | |
| 5,830,321 | A | 11/1998 | Lindsay et al. | |
| 5,906,743 | A | 5/1999 | Cohen et al. | |
| 5,945,175 | A | 8/1999 | Yahiaoui et al. | |
| 5,990,377 | A | 11/1999 | Chen et al. | |
| 6,060,636 | A | 5/2000 | Yahiaoui et al. | |
| 6,066,286 | A | 5/2000 | Myers | |
| 6,087,002 | A | 7/2000 | Kimura et al. | |
| 6,110,158 | A | 8/2000 | Kielpikowski | |
| 6,114,407 | A | 9/2000 | Myers | |
| 6,117,515 | A | 9/2000 | Brunson et al. | |
| 6,187,137 | B1 | 2/2001 | Druecke et al. | |
| 6,197,154 | B1 | 3/2001 | Chen et al. | |
| 6,261,679 | B1 | 7/2001 | Chen et al. | |
| 6,264,791 | B1 | 7/2001 | Sun et al. | |
| 6,294,222 | B1 | 9/2001 | Cohen et al. | |
| 6,322,665 | B1 | 11/2001 | Sun et al. | |
| 6,339,888 | B1 | 1/2002 | Brunson et al. | |
| 6,348,679 | B1 | 2/2002 | Ryan et al. | |
| 6,395,957 | B1 | 5/2002 | Chen et al. | |
| 6,419,798 | B1 | 7/2002 | Topolkaraev et al. | |
| 6,436,234 | B1 | 8/2002 | Chen et al. | |
| 6,660,211 | B1 * | 12/2003 | Topolkaraev et al. | 264/475 X |

FOREIGN PATENT DOCUMENTS

| | | | |
|---|---|---|---|
| GB | 1408262 | A | 10/1975 |
| WO | 96/37292 | A1 | 11/1996 |
| WO | 99/34041 | A1 | 7/1999 |
| WO | 01/31122 | A1 | 5/2001 |
| WO | 01/48025 | A1 | 7/2001 |

* cited by examiner

METHOD FOR TREATING FIBROUS WEB MATERIALS

BACKGROUND OF THE INVENTION

Many of the medical care garments and products, protective wear garments, mortuary and veterinary products, and personal care products in use today are partially or wholly constructed of thermoplastic nonwoven web materials. Examples of such products include, but are not limited to, medical and health care products such as surgical drapes, gowns and bandages, protective workwear garments such as coveralls and lab coats, and infant, child and adult personal care absorbent products such as diapers, training pants, swimwear, incontinence garments and pads, sanitary napkins, wipes and the like. For these applications nonwoven materials provide tactile, comfort and aesthetic properties which can approach those of traditional woven or knitted cloth materials. Nonwoven web materials are also widely utilized as filtration media for both liquid and gas or air filtration applications since they can be formed into a filter mesh of fine fibers having a low average pore size suitable for trapping particulate matter while still having a low pressure drop across the mesh.

Nonwoven web materials have a physical structure of individual fibers or filaments which are interlaid in a generally random manner to form a fibrous web material. The fibers may be continuous or discontinuous, and are frequently produced from thermoplastic polymer or copolymer resins from the general classes of polyolefins, polyesters and polyamides, as well as numerous other polymers. Blends of polymers or conjugate multicomponent fibers may also be employed. Nonwoven materials formed by melt extrusion processes such as spunbonding and meltblowing, and formed by dry-laying processes such as carding or air-laying of staple fibers are well known in the art. In addition, nonwoven materials may be used in composite materials in conjunction with other nonwoven layers as in a spunbond/meltblown (SM) and spunbond/meltblown/spunbond (SMS) laminate materials, and may also be used in combination with thermoplastic films.

Nonwoven materials may be topically treated to impart various desired properties, depending on end-use application. For example, some applications such as components for diapers and other incontinence products and feminine hygiene products call for nonwoven materials which are highly wettable and will quickly allow liquids to pass through them. For these applications it is desirable to treat the nonwoven materials with surfactants or other chemicals to impart hydrophilicity. On the other hand, for applications such as surgical drapes and gowns, and other protective garments, liquid barrier properties are highly desirable, and specifically desirable are nonwoven materials which have a high degree of repellency to low surface tension liquids such as alcohols, aldehydes, ketones and hydrophilic liquids, such as those containing surfactants. Repellency to low surface tension liquids may be achieved by treating the nonwoven material with chemicals such as fluorochemical compounds known in the art. Topical treatments are available to impart other properties as well, such as antistatic treatments for example.

Topical treatments are typically applied to fibrous web materials such as nonwoven materials in the form of a treatment chemical carried in a liquid, often aqueous, medium as a solution, suspension or emulsion. Once the treatment has been applied to the nonwoven material it is generally necessary to remove the excess moisture in the nonwoven material sheet by drying. Conventionally, the moisture is removed by blowing heated air on the nonwoven material or by running the nonwoven material over and in contact with heated surfaces such as rollers or cans until it is dry or nearly dry. However, a wetted nonwoven material generally will not dry in all places at the same rate; therefore with conventional drying techniques certain areas of the nonwoven material will become completely dry while other areas still contain moisture, and these areas which dry first will experience continued and excessive heat from the drying process while the entire sheet of material is dried to a satisfactory level of residual moisture. This additional heating of the nonwoven material can deleteriously affect the material and degrade material properties such as by causing heat shrinkage of the material, reducing material tensile strength, causing the material to become embrittled and/or surface glazed and thereby unpleasant to the touch, and decreasing barrier properties in SMS laminate materials.

Consequently, there remains a need for an efficient treatment method that provides treated thermoplastic nonwoven materials without unduly negatively impacting the material and material properties compared with methods heretofore known.

SUMMARY OF THE INVENTION

Figure 1:
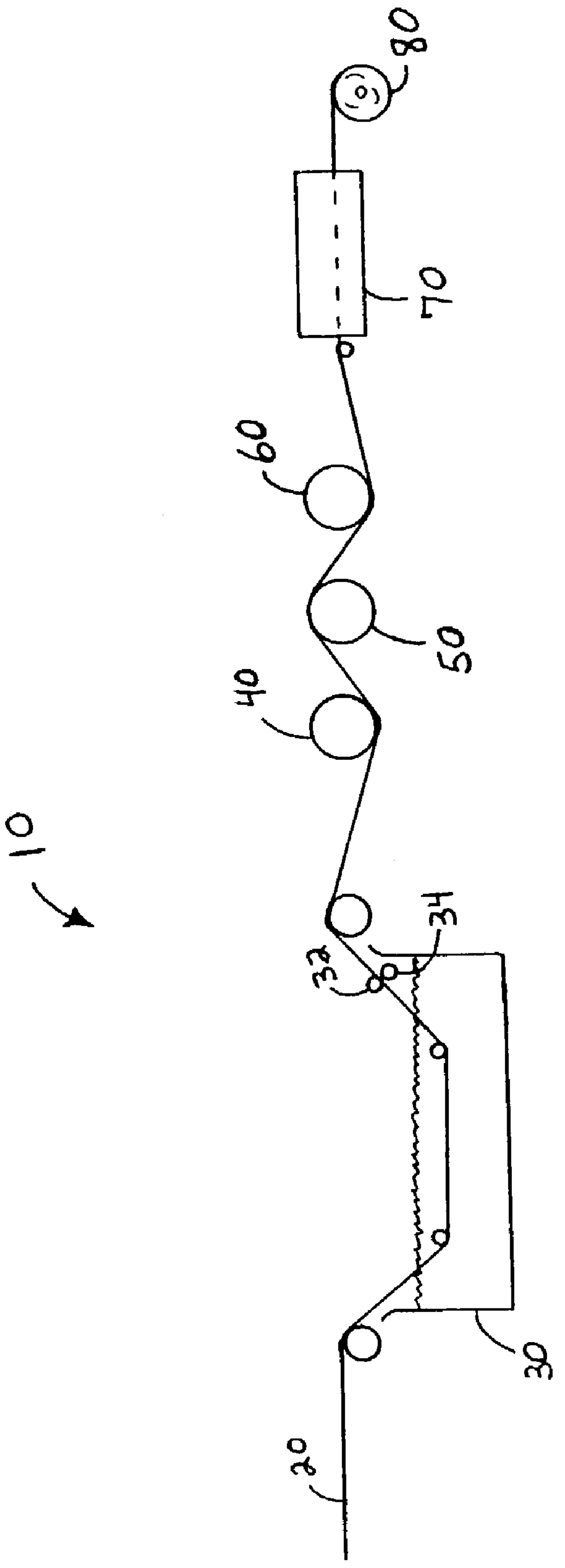
FIG. 1 is a schematic illustration of an exemplary process for topically treating fibrous webs in accordance with the invention.

The present invention provides a method for treating a fibrous web material including the steps of providing a fibrous web material, treating the web material with a topical treatment which includes a treatment chemical and a liquid carrier medium, partially drying the treated web material such that after the partial drying step the web material has less than about 40 percent and at least about 10 percent by weight residual moisture and then passing the web material through a radio frequency energy field to further dry the web. After passing through the radio frequency energy field the web has less than about 5 percent by weight residual moisture, desirably less than about 2 percent, more desirably less than about 1 percent, and still more desirably less than about 0.5 percent by weight residual moisture.

The partial drying step may be performed by applying vacuum or external heat to the fibrous web material, and the fibrous web material may desirably be thermoplastic nonwoven web material or thermoplastic nonwoven barrier laminate material. The topical treatment may desirably be a liquid-repellent treatment, a hydrophilic treatment or an anti-static treatment. In certain embodiments, the web after partial drying has about 20 percent to about 10 percent by weight residual moisture. The radio frequency energy field may have a frequency ranging from about 10 megahertz to about 50 megahertz. Also provided are fibrous web materials obtained in accordance with embodiments of the method of the invention.

DEFINITIONS

As used herein and in the claims, the term “comprising” is inclusive or open-ended and does not exclude additional unrecited elements, compositional components, or method steps.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

As used herein the term "fibers" refers to both staple length fibers and continuous filaments, unless otherwise indicated.

As used herein the term "monocomponent" fiber refers to a fiber formed from one or more extruders using only one polymer extrudate. This is not meant to exclude fibers formed from one polymer to which small amounts of additives have been added for color, anti-static properties, lubrication, hydrophilicity, etc. These additives, e.g. titanium dioxide for color, are generally present in an amount less than 5 weight percent and more typically about 2 weight percent.

As used herein the term "multicomponent fibers" refers to fibers which have been formed from at least two component polymers, or the same polymer with different properties or additives, extruded from separate extruders but spun together to form one fiber.

Multicomponent fibers are also sometimes referred to as conjugate fibers or bicomponent fibers. The polymers are arranged in substantially constantly positioned distinct zones across the cross-section of the multicomponent fibers and extend continuously along the length of the multicomponent fibers. The configuration of such a multicomponent fiber may be, for example, a sheath/core arrangement wherein one polymer is surrounded by another, or may be a side by side arrangement, an "islands-in-the-sea" arrangement, or arranged as pie-wedge shapes or as stripes on a round, oval, or rectangular cross-section fiber. Multicomponent fibers are taught in U.S. Pat. No. 5,108,820 to Kaneko et al., U.S. Pat. No. 5,336,552 to Strack et al., and U.S. Pat. No. 5,382,400 to Pike et al. For two component fibers, the polymers may be present in ratios of 75/25, 50/50, 25/75 or any other desired ratios.

As used herein the term "nonwoven web" or "nonwoven material" means a web having a structure of individual fibers or filaments which are interlaid, but not in an identifiable manner as in a knitted or woven fabric. Nonwoven webs have been formed from many processes such as for example, meltblowing processes, spunbonding processes, air-laying processes and carded web processes. The basis weight of nonwoven fabrics is usually expressed in grams per square meter (gsm) or ounces of material per square yard (osy) and the fiber diameters useful are usually expressed in microns. (Note that to convert from osy to gsm, multiply osy by 33.91).

The term "spunbond" or "spunbond nonwoven web" refers to a nonwoven fiber or filament material of small diameter fibers that are formed by extruding molten thermoplastic polymer as fibers from a plurality of capillaries of a spinneret. The extruded fibers are cooled while being drawn by an eductive or other well known drawing mechanism. The drawn fibers are deposited or laid onto a forming surface in a generally random manner to form a loosely entangled fiber web, and then the laid fiber web is subjected to a bonding process to impart physical integrity and dimensional stability. The production of spunbond fabrics is disclosed, for example, in U.S. Pat. No. 4,340,563 to Appel et al., U.S. Pat. No. 3,802,817 to Matsuki et al. Typically, spunbond fibers or filaments have a weight-per-unit-length in excess of 2 denier and up to about 6 denier or higher, although finer spunbond fibers can be produced. In terms of fiber diameter, spunbond fibers generally have an average diameter larger than 7 microns, and more particularly between about 10 and about 25 microns.

As used herein the term "meltblown fibers" means fibers or microfibers formed by extruding a molten thermoplastic material through a plurality of fine, usually circular, die capillaries as molten threads or fibers into converging high velocity gas (e.g. air) streams which attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers may be continuous or discontinuous, are generally smaller than 10 microns in average diameter and are often smaller than 7 or even 5 microns in average diameter, and are generally tacky when deposited onto a collecting surface.

The term "staple fibers" refers to discontinuous fibers, which typically have an average diameter similar to that of spunbond fibers. Staple fibers may be produced with conventional fiber spinning processes and then cut to a staple length, typically from about 1 inch to about 8 inches. Such staple fibers are subsequently carded or airlaid and thermally or adhesively bonded to form a nonwoven fabric.

As used herein, "thermal point bonding" involves passing a fabric or web of fibers or other sheet layer material to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Other common patterns include a diamond pattern with repeating and slightly offset diamonds and a wire weave pattern looking as the name suggests, e.g. like a window screen. Typically, the percent bonding area varies from around 10% to around 30% of the area of the fabric laminate web. Thermal point bonding imparts integrity to individual layers by bonding fibers within the layer and/or for laminates of multiple layers, point bonding holds the layers together to form a cohesive laminate.

As used herein, the term "hydrophilic" means that the polymeric material has a surface free energy such that the polymeric material is wettable by an aqueous medium, i.e. a liquid medium of which water is a major component. The term "hydrophobic" includes those materials that are not hydrophilic as defined. The phrase "naturally hydrophobic" refers to those materials that are hydrophobic in their chemical composition state without additives or treatments affecting the hydrophobicity. It will be recognized that hydrophobic materials may be treated internally or externally with surfactants and the like to render them hydrophilic.

DETAILED DESCRIPTION OF THE INVENTION

The present invention provides a method for topically treating fibrous web materials such as thermoplastic nonwoven materials and nonwoven barrier laminate materials. The method includes providing the fibrous web material, topically treating the fibrous web material with a liquid-carried treatment chemical, partially drying the fibrous web material and then further drying the fibrous web material utilizing a radio frequency energy field.

Conventional topical treatment methods for fibrous webs include brushing or spraying liquid chemical treatment on the web, dipping or saturating the web in a liquid treatment bath and foaming a liquid chemical treatment and applying the foam to the web material.

The invention will be more fully described with reference to FIG. 1. Turning to FIG. 1, there is illustrated in schematic form an exemplary process line 10 which demonstrates an embodiment of the method of treating fibrous web materials. Fibrous web material 20 is shown being transported through process line 10. Fibrous web material 20 may desirably be a thermoplastic nonwoven web material or laminate material including thermoplastic nonwoven web materials such as for example spunbonded materials, bonded carded webs, high-loft spunbond and through-air dried nonwovens, spunbond-meltblown-spunbond ("SMS") laminates or spunbond-film-spunbond ("SFS") laminates. As shown in FIG. 1, fibrous web material 20 is topically treated at treatment station 30. Treatment station 30 may desirably be one or more means of applying topical treatment as are known in the art such as for example a brush treater, spray treater, foam treater, or, as shown, a saturation treater such as a dip and squeeze bath.

For the purpose of describing the advantages of the invention, FIG. 1 and process line 10 will be described with reference to fibrous web material 20 being a nonwoven barrier laminate material such as for example a spunbond-meltblown-spunbond laminate or "SMS" laminate material which may be produced in accordance with U.S. Pat. No. 4,041,203 to Brock et al., incorporated herein by reference in its entirety. Because of their liquid barrier properties, SMS laminate materials are highly suitable as protective fabrics and are used as or as part of surgical suite wear such as patient drapes and surgical gowns, and also may be used in protective or industrial workwear. However, in order to more fully protect the wearer from harmful exposure to contaminants the laminate material should have a high degree of repellency to low surface tension liquids such as surfactant containing aqueous solutions, alcohols, aldehydes and ketones. Repellency to low surface tension liquids may be imparted to the laminate material by use of a treatment chemical such as for example fluorocarbon compound treatments as are disclosed in U.S. Pat. No. 5,149,576 to Potts et al. and U.S. Pat. No. 5,178,931 to Perkins et al., both incorporated herein by reference in their entireties, and fluorocarbon compound treatments are available commercially.

To impart repellency to low surface tension liquids, treatment station 30 may desirably be a dip and squeeze station as is known in the art and which contains a bath of an aqueous emulsion of fluorocarbon compound. The fibrous web material 20 travels a path which immerses the web in the bath to saturate it with the treatment emulsion. Web material 20 continues through nip rollers 32 and 34 which squeeze off the excess treatment bath emulsion. Despite having the excess bath removed by nip rollers 32 and 34, the web material 20 will typically have about a 100 percent "wet pick up" upon exiting treatment station 30. That is, a web material of approximately 70 gsm when dry will weigh approximately 140 gsm after exiting treatment station 30 and nip rollers 32 and 34, and must be dried prior to storage of the material. The web material should contain as little residual moisture as is practicable, desirably less than about 5 percent moisture by weight, more desirably less than about 2 percent by weight, and still more desirably less than about 1 percent or even 0.5 percent by weight residual moisture.

A conventional method well known in the art for drying treated webs is the use of steam canisters, such as the steam canisters 40, 50 and 60 which are incorporated as part of the treatment process shown in FIG. 1. Fibrous web 20 travels between and in tensioned contact with canisters 40, 50 and 60 which are heated with steam to heat the web material and drive off moisture via evaporation. Typically, the number and/or temperature of the steam canisters will be adjusted to match the amount of drying needed in order to fully or nearly fully dry the fibrous web material. However, this has several drawbacks. Because the planar surfaces of the web material are in direct contact with the heated canisters, the outer surfaces of web material will tend to become fully dry well before the center of the material, which will result in the surfaces of the material being exposed to overheating. Further, certain areas of a moving web material, often the edges and the transverse middle portion of the web, will be under more tension than other areas of the web and be pressed against the heated canisters with more force than the other areas of the web material, resulting in these higher tension areas becoming dry before the other areas and therefore being exposed to overheating. Because the web materials are made with thermoplastic resins, overheating of the web material surfaces and overheating of other high tension areas results in undesirable heat-glazing (that is, a slight to moderate melting) of the material surfaces, making the material stiff and making the material surfaces harsh and unappealing to the touch. Also, overheating of the web material generally causes heat shrinkage of the material, often resulting in web width losses of 5 percent or even greater.

In order to alleviate the overheating problems caused by attempting to fully dry the fibrous web material 20 with external heat, FIG. 1 and process line 10 further include a radio frequency station 70 which generates a radio frequency energy field through which fibrous web 20 passes. In the practice of the invention, rather than fully drying the fibrous web material with the externally applied heat of the steam canisters, the web material is only partially dried until it retains about 40 percent by weight or less of residual moisture. Depending on equipment available and the particular web to be dried, it may be advantageous to partially dry the web until it has only about 20 percent or only about 10 percent by weight of residual moisture. As explained below, to avoid overheating the web material it is important that the web still retain some moisture after the partial drying step. Further drying is accomplished by the radio frequency energy at radio frequency drying station 70.

As known in the art, radio frequency energy or dielectric is an alternating electromagnetic field which causes susceptible molecules to attempt to orient the molecular poles alternatingly to follow the alternating electromagnetic field. Molecules susceptible to the dielectric field include polar molecules such as the water molecule and other polar liquid solvents in which treatment chemicals are typically dissolved, suspended or emulsified. As the molecules in the liquid continue to alternatingly reorient themselves they "vibrate" and thereby gain frictional heat energy and cause evaporation of the liquid. However, because conventional thermoplastic resins useful for fibrous nonwoven web materials are generally non-polar molecules they are not susceptible to the radio frequency energy field, and are therefore not heated by the radio frequency energy. In this manner the fibrous web material may be further dried until it has less than about 5 percent by weight moisture, and desirably until is has less than about 2 percent moisture, without any dried portions of the web being contacted by external heat sources in excess of 100 degrees Celsius and thereby avoiding the deleterious effects of overheating. Radio frequency "ovens" are commercially available which produce radio frequency energy fields at frequencies of from about 1 megahertz (MHz) to about 80 megahertz, typically from about 10 to about 50 megahertz, and commonly available radio frequency units are available at 13, 27 and 40 MHz. Although not shown in FIG. 1, radio frequency drying station 70 may desirably also include a vent or vacuum system suitably attached to evacuate the water vapor produced by drying the web.

As shown in FIG. 1, as the fibrous web material 20 exits the radio frequency drying station 70 it may be wound up as a roll of dried web material on winding roll 80. As an alternative to taking the dried fibrous web material up on winding roll 80, the material may be directed to various finishing steps such as web slitting, stretching or further treating, or may be directed immediately to various converting or integrated product forming operations.

As another example, the fibrous web material 20 may be a lofty nonwoven material such as a bonded carded staple fiber web, or as a spunbond web material made with crimped multicomponent or bicomponent fibers in side-by-side or eccentric sheath-core arrangement. Such crimped multicomponent fibers and lofty webs are described in U.S. Pat. No. 5,382,400 to Pike et al., incorporated herein by reference in its entirety. Lofty nonwoven web materials find extensive use in personal care absorbent products, and for many such uses it is desirable for the nonwoven web materials to be wettable. Wettability may be imparted by topically treating the web with, for example, surfactant treatments as are known in the art by saturation dipping at treatment station 30, or alternatively by such well known methods as brush treating, spraying or foaming. The partial drying step may be accomplished by the steam canisters as shown in FIG. 1. Alternatively, because lofty nonwoven webs typically have much higher air permeability than the barrier laminate materials previously discussed, it would also be useful to employ means such as a vacuum or through air drying using heated air to partially dry the web until it retains less than about 40 percent by weight residual moisture as stated above. Then, the remainder of the moisture may be evaporated by radio frequency heating of the water without overly heating the web.

Where steam canisters are the means used for partial drying of the lofty nonwoven web, the use of a radio frequency energy field to remove the residual moisture in the web can be particularly advantageous for helping to retain the loft of the web. For example, in order to hold the lofty nonwoven web against the steam canister as the web travels over the canister there must be tension on the web, which can result in some compression forces pushing the web against the canister, decreasing the loft of the web. Where these compression forces are still being applied at the point in the process when the web is completely dry and beginning to be overheated, overheating can "set" the web structure, resulting in permanent loss of loft. Also, as mentioned above with regard to barrier laminate materials, continued contact with the hot surface of the steam canisters after the surface of the lofty web is fully dried can result in heat glazing of the surface, making it stiff and harsh to the touch.

Other webs may suitably be treated and dried by use of the invention. For example, nonwoven webs made by the spunbonding method are frequently used for liners and coverstock material for personal care absorbent garments, and are therefore often treated to impart hydrophilicity to assist the absorbent garment in accepting and absorbing bodily fluid exudates from the wearer. Where topical liquid surfactant application is desired, as by spray treater, a vacuum source is generally applied to the liner materials to remove the excess liquid treatment. Still, after vacuum removal of excess treatment the webs contain substantial moisture, which can lead to undesirable microorganism growth on the webs if the webs are stored in this moist condition. However, liner and coverstock materials are meant to be used in close contact with intimate portions of the user's anatomy, and prior to treatment these materials will already have undergone at least one heat-intensive processing step such as thermal point bonding. Therefore the method described herein, utilizing vacuum to partially dry the web materials and utilizing radio frequency energy to further dry the web to a fully or nearly fully dry state is an advantageous way to avoid unnecessary additional heating of the webs. The vacuum extraction may additionally be used in combination with the external heat partial drying as described above.

Polymers suitable for the fibrous web materials include the known polymers suitable for production of nonwoven webs and materials such as for example polyolefins, polyesters, polyamides, polycarbonates and copolymers and blends thereof. However it should be noted that certain commercially available polymers and staple-length fibers which have abundant dipoles or which have had other radio frequency susceptible added to the polymer are susceptible to radio frequency heating, such as for example the CoPET-A "Kodel 410" binder fibers available from the Eastman Chemical Company. These types of polymers and fibers should not be use unless it is specifically desired to heat bond or partially heat bond the fibrous web material while performing the further drying step in the radio frequency drying station.

Numerous other patents have been referred to in the specification and to the extent there is any conflict or discrepancy between the teachings incorporated by reference and that of the present specification, the present specification shall control. Additionally, while the invention has been described in detail with respect to specific embodiments thereof, it will be apparent to those skilled in the art that various alterations, modifications and/or other changes may be made without departing from the spirit and scope of the present invention. It is therefore intended that all such modifications, alterations and other changes be encompassed by the claims.

We claim:

1. A method for treating a fibrous web material comprising the steps of:

a) providing a fibrous web material;

b) treating the fibrous web material with a topical treatment, the topical treatment comprising a treatment chemical and a liquid carrier medium;

c) partially drying the fibrous web material, wherein after partial drying the fibrous web material comprises about 40 percent to about 10 percent by weight residual moisture; and thereafter d) passing the fibrous web material through a radio frequency energy field, wherein after passing through the radio frequency energy field the fibrous web material comprises less than about 5 percent by weight residual moisture.

2. The method of claim 1 wherein the step of partially drying the web is performed by applying vacuum or external heat to the fibrous web material.

3. The method of claim 2 wherein the fibrous web material is a thermoplastic nonwoven web material.

4. The method of claim 3 wherein the topical treatment is a liquid-repellent treatment, a hydrophilic treatment or an anti-static treatment, and further wherein the liquid carrier medium comprises water.

5. The method of claim 4 wherein the thermoplastic nonwoven web material is a nonwoven barrier laminate material.

6. The method of claim 5 wherein the topical treatment is a fluorochemical in aqueous emulsion.

7. The method of claim 4 wherein the external heat is applied by streams of heated air or contacting at least one planar surface of the web material with at least one heated canister.

8. The method of claim 6 wherein the external heat is applied by contacting at least one planar surface of the web material with at least one heated canister.

9. The method of claim 8 wherein the step of treating with a topical treatment is performed by dip saturation, spraying or foaming.

10. The method of claim 7 wherein after the step of partial drying the fibrous web material comprises about 20 percent to about 10 percent by weight residual moisture.

11. The method of claim 8 wherein after the step of partial drying the fibrous web material comprises about 20 percent to about 10 percent by weight residual moisture.

12. The method of claim 10 wherein after the step of passing through the radio frequency energy field the fibrous web material comprises less than about 2 percent by weight residual moisture.

13. The method of claim 12 wherein after the step of passing through the radio frequency energy field the fibrous web material comprises less than about 1 percent by weight residual moisture.

14. The method of claim 13 wherein after the step of passing through the radio frequency energy field the fibrous web material comprises less than about 0.5 percent by weight residual moisture.

15. The method of claim 11 wherein after the step of passing through the radio frequency energy field the fibrous web material comprises less than about 2 percent by weight residual moisture.

16. The method of claim 15 wherein after the step of passing through the radio frequency energy field the fibrous web material comprises less than about 1 percent by weight residual moisture.

17. The method of claim 16 wherein after the step of passing through the radio frequency energy field the fibrous web material comprises less than about 0.5 percent by weight residual moisture.

18. The method of claim 1 wherein the radio frequency energy field is applied at a frequency of from about 10 megahertz to about 50 megahertz.

* * * * *